(No Model.)

A. W. & D. KENNEY.
CORN PLANTER.

No. 341,248. Patented May 4, 1886.

WITNESSES
Phill Masi
B. Frigitt

INVENTOR
A. W. Kenney,
D. Kenney,
by Anderson & Smith
their Attorneys

UNITED STATES PATENT OFFICE.

ABERHAM W. KENNEY AND DANIEL KENNEY, OF WALKER, MISSOURI.

CORN-PLANTER.

SPECIFICATION forming part of Letters Patent No. 341,248, dated May 4, 1886.

Application filed September 18, 1885. Serial No. 177,499. (No model.)

*To all whom it may concern:*

Be it known that we, ABERHAM W. KENNEY and DANIEL KENNEY, citizens of the United States, residing at Walker, in the county of Vernon and State of Missouri, have invented certain new and useful Improvements in Corn-Planters; and we do declare the following to be a full, clear, and exact description of the invention, such as will enable others skilled in the art to which it appertains to make and use the same, reference being had to the accompanying drawings, and to letters or figures of reference marked thereon, which form a part of this specification.

Figure 1:
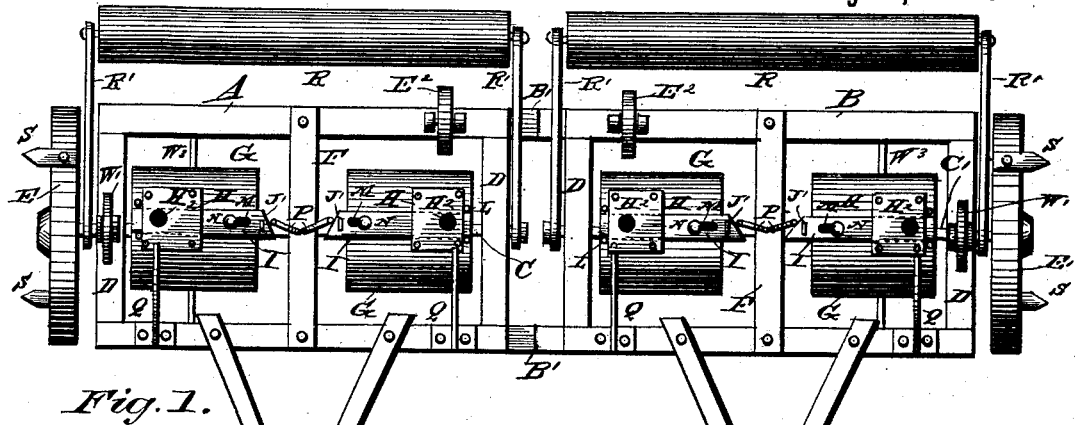
Figure 2:
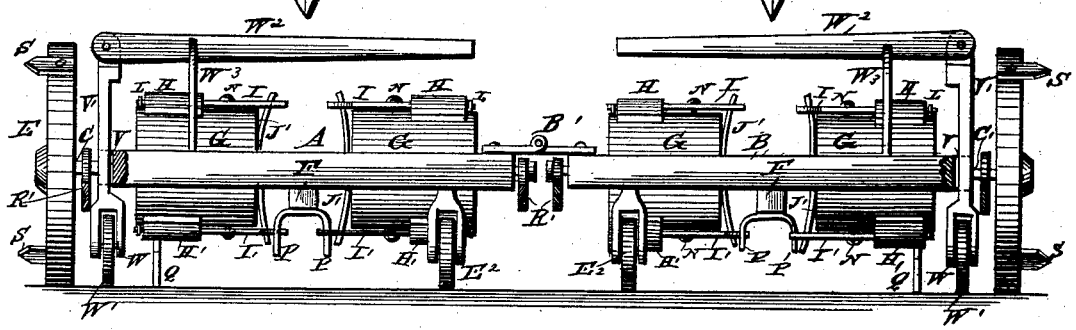
Figures 3, 4:
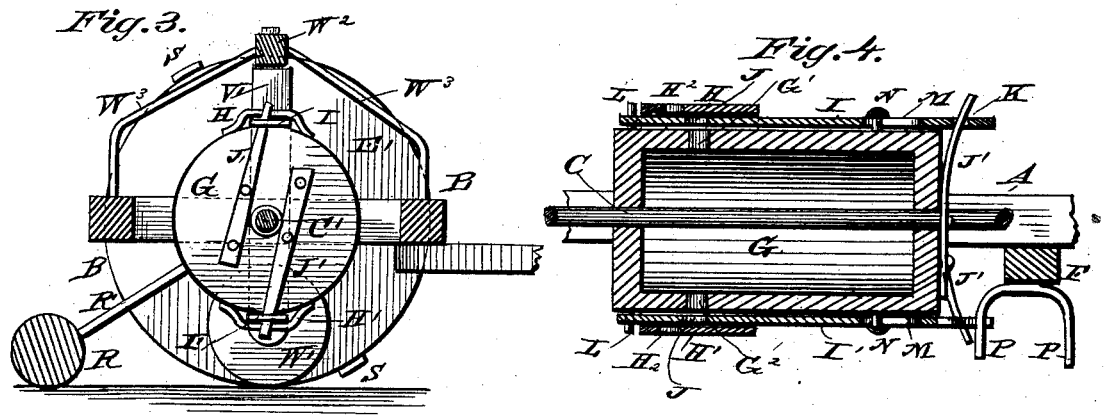

Figure 1 of the drawings is a representation of a bottom plan view. Fig. 2 is an end elevation. Fig. 3 is a transverse section. Fig. 4 is a longitudinal vertical section of one of the cylinders.

Our invention relates to corn-planters; and it consists in the construction and novel combination of parts, as will be hereinafter fully described, and particularly pointed out in the claims.

Referring by letter to the accompanying drawings, A and B designate two rectangular open frames, hinged together at their inner ends by strap-hinges B' B', so that the frames or sections may move vertically and independently of each other when passing over the ground to accommodate the sections to the unevenness of the ground. Axles C C' traverse the frames longitudinally and project through the end beams, D D, of the frames at both ends thereof. Upon the outer ends of the axles C C' the larger supporting-wheels, E E', are fixed, and the axle turns with said wheels when the machine is drawn over the ground.

$E^2$ $E^2$ are smaller supporting-wheels at the rear of and near the inner ends of the frames.

Each of the frames A and B is provided with a transverse middle bar, F, which is secured at its ends to the under faces of the longitudinal bars of its frames and passes under the axle.

At opposite sides of the middle bar, F, and fixed to the axles, each of the sections or frames A and B is provided with a hollow cylinder or receptacle, G, having discharge-openings G' $G^2$ in their peripheries at diametrically-opposite points and about midway of their lengths. These discharge-openings G' $G^2$ are covered by cap-plates H H', having discharge-openings $H^2$ in them, which discharge-openings $H^2$, however, are not aligned with the discharge-openings G' $G^2$.

Between the cylinders G and the cap-plates are provided the dropping-slides I I', which are each provided with an opening, J, which forms the seed-cup, and, although not normally in line with its discharge-opening, can be brought into line therewith by mechanism hereinafter described. The dropping-slides I I' are beveled from edge to edge upon their inner ends, and are connected to the outer ends of flat springs J' J', secured to the inner cylinder-heads, projecting in opposite directions and extending through openings K K, near the beveled ends of the dropping-slides I I'. Near their outer ends the dropping-slides I I' work between guide-pins L L, projecting above the periphery of the seed-cylinders. Near their inner ends the dropping-slides I I' are provided with slightly elongated slots M, through which headed pins N N are driven into the cylinders and serve as stop-pins and limit the sliding movement of the dropping-slides.

The transverse middle bar, F, is provided with two depending arms, P P, against which the beveled ends of the dropping-slides I I' strike when the cylinders are revolved, and these arms drive the dropping-slides outwardly and cause the seed to be discharged, after which the springs J' J' return the slides to place.

Plowshares Q Q, secured to the front longitudinal beam of the frame, open the furrows for the seed, and a roller, R, hinged or pivoted to the axle by arms R', follows the dropping-cylinders and covers the seed.

The frames A and B can be disconnected and either frame used separately.

The larger supporting-wheels, E E', are provided on their peripheries at diametrically-opposite points with markers S S, which mark the ground and indicate to the driver the points at which the seed has been dropped and covered, so that he can operate the machine to cause the rows to be straight and to be workable rows each way—*i. e.*, both crosswise and lengthwise of the field.

The outer end rails, A', of the frames A and B are provided just in rear of the axle and in their outer faces with vertical notches V, in which vertical legs V' work. These legs V' are bifurcated in their lower ends, and in these bifurcations W are journaled small wheels or disks W'. To the upper ends of these legs V' are pivoted levers W², which are fulcrumed upon curved rods W³, secured to the front and rear bars of the frames A and B. By raising these levers W², the disks W' will be depressed and the marker-wheels will be lifted from the ground, so that the machine can be moved on the small wheels or disks to bring the markers to the proper point to start right whenever it may be necessary.

Each frame A B is provided with a tongue to hitch the team to.

Having thus described our invention, what we claim, and desire to secure by Letters Patent, is—

1. The combination, with the rectangular frame having the rear wheel and the large marking and supporting wheel secured to the end of the axle, of the bifurcated standard with the disk at its lower end and the operating-lever at its upper end, the middle bar with its depending arm P P, the seed-cylinders with diametrically-opposite discharge-openings, the cap-plates, and the spring-actuated dropping-slides with beveled inner ends, substantially as specified.

2. The combination, with the hinged rectangular frames having the rear supporting-wheels, and the large marking and supporting wheels secured to the outer ends of the coupled sectional axle, the levers with pivoted bifurcated legs or standards having disks or wheels in their bifurcated lower ends, the seed-cylinders with diametrically-opposite discharge-openings, the cap-plates with seed-openings, the slotted dropping-slides with slotted beveled inner ends, and the springs secured to the inner ends of the cylinders and engaging the inner ends of the dropping-slides, substantially as specified.

In testimony whereof we affix our signatures in presence of two witnesses.

ABERHAM W. KENNEY.
DANIEL KENNEY.

Witnesses:
CALEB EMBREE,
HENRY B. GORDON.